(12) United States Patent
Catteau et al.

(10) Patent No.: US 7,819,313 B2
(45) Date of Patent: Oct. 26, 2010

(54) ELECTRONIC LABEL ANTENNA

(75) Inventors: Philippe Catteau, Neuilly-sur-Seine (FR); Pierre Legras, Strasbourg (FR)

(73) Assignee: Store Electronic Systems Electronic Shelf Label, Bezons (FR)

( * ) Notice: Subject to any disclaimer, the term of this patent is extended or adjusted under 35 U.S.C. 154(b) by 0 days.

(21) Appl. No.: 10/517,699

(22) PCT Filed: Jun. 16, 2003

(86) PCT No.: PCT/FR03/01815

§ 371 (c)(1),
(2), (4) Date: May 16, 2005

(87) PCT Pub. No.: WO03/107267

PCT Pub. Date: Dec. 24, 2003

(65) Prior Publication Data

US 2005/0253685 A1 Nov. 17, 2005

(30) Foreign Application Priority Data

Jun. 14, 2002 (FR) .................................. 02/07363

(51) Int. Cl.
| G06K 15/00 | (2006.01) |
| G06K 19/06 | (2006.01) |
| G06F 19/00 | (2006.01) |
| G06F 3/038 | (2006.01) |
| G06Q 30/00 | (2006.01) |
| G06Q 90/00 | (2006.01) |
| G09G 3/34 | (2006.01) |
| G09G 5/00 | (2006.01) |

(52) U.S. Cl. ....................... 235/383; 235/385; 235/492; 345/107; 345/204

(58) Field of Classification Search .................. 235/492, 235/380, 375, 385, 383, 378; 455/41, 343; 361/737; 345/204, 107; 340/572.7, 5.61; 257/789

See application file for complete search history.

(56) References Cited

U.S. PATENT DOCUMENTS

| 4,178,100 | A | * | 12/1979 | Frosch et al. | ................ | 356/216 |
| 4,263,595 | A | * | 4/1981 | Vogel | ............................ | 342/44 |
| 4,771,289 | A | * | 9/1988 | Masak | ......................... | 342/383 |
| 5,850,416 | A | * | 12/1998 | Myer | .......................... | 235/385 |
| 6,118,426 | A | * | 9/2000 | Albert et al. | ................. | 345/107 |
| 6,404,644 | B1 | | 6/2002 | Ikefuji et al. | | |

(Continued)

FOREIGN PATENT DOCUMENTS

| EP | 0 447 278 A2 | 9/1991 |
| WO | WO 01/44919 A1 | 6/2001 |

OTHER PUBLICATIONS

International Search Report for PCT/FR03/01815 completed Oct. 3, 2003.

*Primary Examiner*—Thien M. Le
*Assistant Examiner*—Thien T Mai
(74) *Attorney, Agent, or Firm*—Alston & Bird LLP

(57) ABSTRACT

The invention relates to an electronic label (1) for a display system, in particular for displaying prices in a store, the label comprising a housing (5) presenting at least one wall (2), and transmitter means including an antenna (100) suitable for transmitting a signal from the label to a receive antenna of the display system, the antenna (100) extending generally in a plane adjacent to at least one face of the wall (2) in such a manner as to form a stack with a wall.

13 Claims, 1 Drawing Sheet

U.S. PATENT DOCUMENTS

| | | | |
|---|---|---|---|
| 6,427,065 B1* | 7/2002 | Suga et al. | 455/41.1 |
| 6,437,985 B1* | 8/2002 | Blanc et al. | 361/749 |
| 6,480,182 B2* | 11/2002 | Turner et al. | 345/107 |
| 6,585,165 B1* | 7/2003 | Kuroda et al. | 235/492 |
| 6,731,197 B1* | 5/2004 | Dajaeger et al. | 235/383 |
| 6,753,830 B2 | 6/2004 | Gelbman | |
| 6,786,407 B1* | 9/2004 | Takasugi | 235/451 |
| 6,862,461 B2* | 3/2005 | Gawne | 455/557 |
| 6,886,745 B2 | 5/2005 | Berrube et al. | |
| 6,950,023 B1* | 9/2005 | Martin | 340/572.7 |
| 6,959,862 B2* | 11/2005 | Neumark | 235/385 |
| 7,026,913 B2* | 4/2006 | Bhyravabhotla | 235/383 |
| 2002/0167500 A1* | 11/2002 | Gelbman | 345/204 |
| 2003/0020182 A1* | 1/2003 | Blanc et al. | 257/789 |

\* cited by examiner

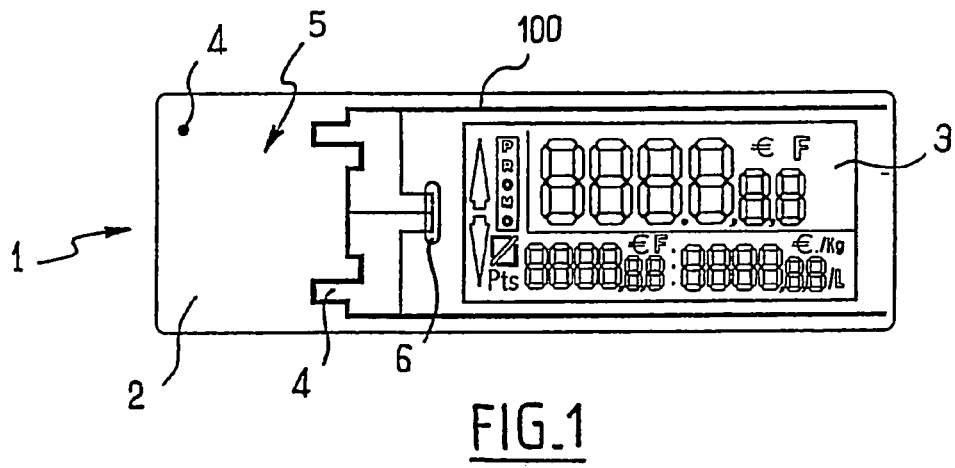
FIG_1
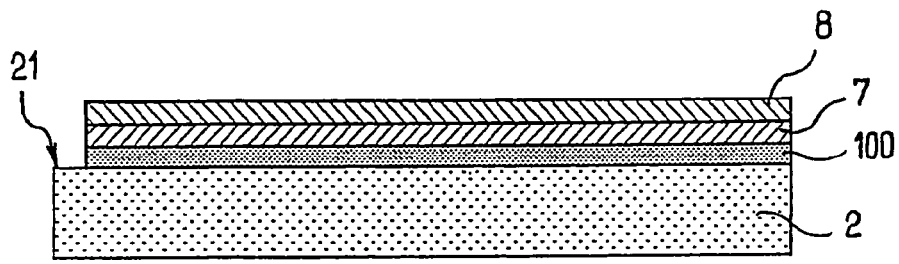
FIG_2
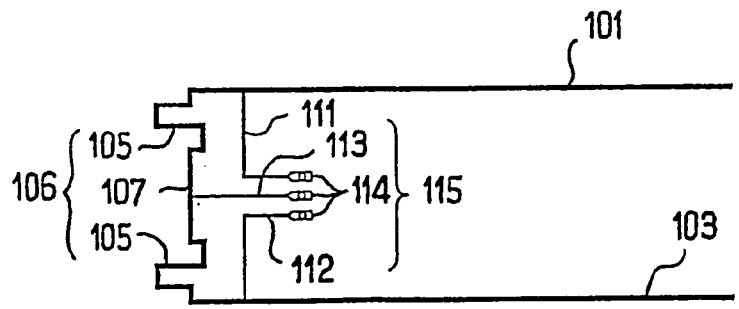
FIG_3
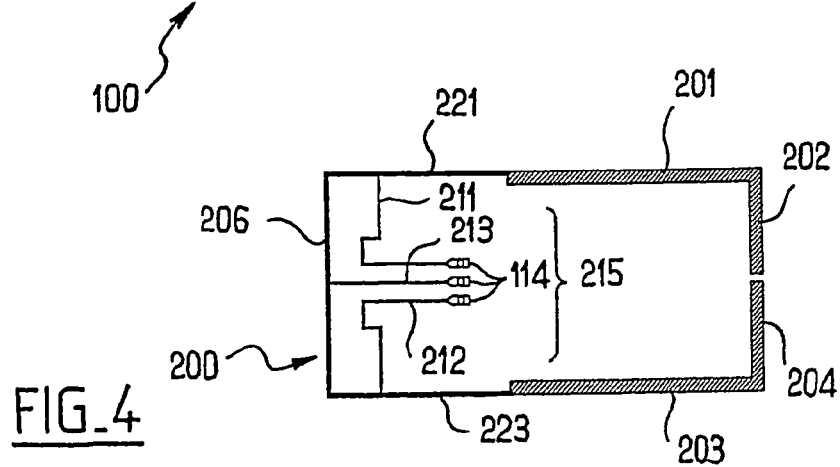
FIG_4

ELECTRONIC LABEL ANTENNA

BACKGROUND OF THE INVENTION

The invention relates to electronic labels for systems for displaying prices, in particular in stores of the hypermarket type.

Electronic labels such as those described in document EP 0 447 278 include means for receiving information coming from a central station. Those receiver means include a receive antenna electromagnetically coupled with a current loop constituting the transmit antenna of the central station.

However, although the central station is capable of sending arbitrary information to a given label, it is not capable of receiving information from said label unless the label is itself fitted with means for transmitting information to the central station. Such transmitter means include a transmit antenna electromagnetically coupled with a receive antenna of the central station.

For example, the use of a traditional transmit antenna would require the antenna to be constituted by a wire having a length of about 17 centimeters (cm), which is an antenna length suitable for use with frequencies of about 433 megahertz (MHz), and for the antenna to project outwards from the label perpendicularly to a main plane of the label housing, in order to transmit under good conditions. That would lead to the label occupying an amount of space that is not compatible with the label being used on the shelves of a store of the supermarket or hypermarket type, for example.

In addition, it would be very expensive for the label to use a transmit antenna comprising a ferrite rod, even though such an antenna would be smaller in size, and thus more compatible with the intended use. In order to operate, such an antenna needs to be very accurately adjusted, thereby considerably increasing the cost price of the label.

BRIEF SUMMARY OF THE INVENTION

An object of the invention is to provide an electronic label including transmitter means that are both compact and inexpensive.

To this end, the invention provides an electronic label for a display system, in particular for displaying prices in a store, the label comprising a housing presenting at least one wall, and transmitter means including an antenna suitable for transmitting a signal from the label to a receive antenna of the display system, the label being characterized in that the antenna extends generally in a plane adjacent to at least one face of the wall in such a manner as to constitute a stack together with said wall.

Thus, the antenna merely forms a slight extra thickness on the inside or the outside of the wall of the housing. In both cases, this thickening increases the overall size of the label imperceptibly, and the label remains entirely compatible with being used, in particular on the shelves of a store of the hypermarket type.

Advantageously, but optionally, the electronic label presents at least one of the following additional characteristics:

the antenna is a film antenna comprising a conductive pattern disposed on a supporting sheet;
the label includes an insulating layer disposed on the face of the wall of the housing in such a manner that the antenna is sandwiched between the wall and the insulating layer;
the insulating layer comprises a decorative layer;
the supporting sheet forms the insulating layer;
the face is an outside face;
the wall is a front wall;
the front wall includes a display, and the antenna extends on the face of the wall around the display;
the antenna is a wire antenna;
the antenna comprises at least two antenna heads;
the antenna heads extend on either side of the display;
the antenna heads are connected to each other at one of their ends by an electrical bridge;
each portion of the antenna is connected to the electronic label in independent manner, in particular by means of a flat cable;
the label includes an electronic circuit, and the antenna includes a flat cable suitable for electrically connecting the antenna to the electronic circuit;
the flat cable includes at least one tab suitable for being soldered to the electronic circuit;
the tab presents a through orifice suitable for receiving solder; and
the wall includes a through orifice suitable for passing the flat cable.

BRIEF DESCRIPTION OF THE DRAWINGS

Other characteristics and advantages of the invention appear better on reading the following detailed description of a preferred embodiment thereof, and also of a variant. In the accompanying drawing:

FIG. 1 is a view of the front face of an electronic label in an embodiment of the invention;

FIG. 2 is a diagrammatic section view of the stacked structure constituting the front face of the FIG. 1 label;

FIG. 3 is a flat plan view of the antenna of the FIG. 1 label; and

FIG. 4 is a flat plan view of an antenna for a label in a variant embodiment of the invention.

DETAILED DESCRIPTION OF THE INVENTION

With reference to FIG. 1, an electronic label 1 in a preferred embodiment comprises a housing 5 containing an electronic circuit (not shown) forming the core of said electronic label. The housing 5 presents a front wall 2. The portion of this front wall 2 presents a display 3 of the liquid crystal (LCD) type connected to the electronic circuit in such a manner as to display information contained in a memory (not shown) of said electronic circuit. Such electronic labels are described in particular in document WO 01/44919 to which reference can be made for greater detail.

The electronic label 1 forms part of a system for displaying prices in particular in stores of the hypermarket or supermarket type. The display system comprises a central station possessing means for transmitting information to the electronic labels, which, for this purpose, include means for receiving such information, said means being preferably integrated in the electronic circuit. For greater detail, reference can be made to document EP 0 447 278.

Preferably, in the invention, the electronic label 1 also has means 100 for transmitting information. This information is to be received by receiver means that may be included in the central station of the system. The transmitter means include an antenna 100 which preferably extends along the outside surface of the front wall 2 of the front face of the housing 5 of the electronic label 1. The antenna 100 is electrically connected to the electronic circuit integrated in the housing, and in this case it is connected by means of three electric wire connections passing through a through orifice 6 provided for this purpose in the front wall 2 of the housing 5. By placing the antenna on the outside surface of the front wall of the front face of the housing, the antenna is moved away from metal masses contained within the enclosure of said housing (such as a power supply battery, a printed circuit, and an antenna of the above-mentioned receiver means of the label, etc. . . . ) that might interfere with proper operation of the antenna. In addition, this disposition makes it possible to make use of all of the energy radiated by the antenna by eliminating an obstacle (the wall of the housing) between said antenna and the receiver means of the central station, thereby increasing the transmit range of said antenna.

The arrangement of the antenna 100 on the front wall 2 of the housing 5 is described with reference to FIG. 2. The front wall 2 presents an outside face 21. The antenna 100 is a film antenna comprising a conductive layer deposited on an insulating and preferably flexible film. It is made using standard techniques that are known in themselves for manufacturing printed circuits, in particular flexible printed circuits. Thereafter the antenna is stuck in preferred manner on the face 21. An insulating layer 7 is then put into position serving to avoid any accidental or other contact with the antenna 100 which might disturb or prevent proper operation thereof. The insulating layer is preferably a plastics film including an adhesive so as to be able to stick the plastics film on the antenna 100 and/or directly on the face 21 at those locations where the antenna 100 does not extend over said face.

Thereafter, and optionally, a conventional decorative layer 8 may be placed on the insulating layer 7. The layer 8 is preferably a decorative film, e.g. presenting the colors and the logo of the store in which the electronic label 1 is situated.

In a variant embodiment, the insulating layer 7 may include decoration so as also to act as the above-described decorative layer 8, in which case the decorative layer is no longer necessary.

When the antenna is mounted against an inside face 22 of the front wall 2 (or of any other wall) of the housing, it should be observed that there is no need to have a decorative layer 8. Furthermore, it might not be necessary to have any insulation, providing there is no risk of contact between the antenna 100 and the content of the housing 5 of the electronic label 1 while it is in operation.

The antenna 100 is described below with reference to FIG. 3.

The antenna 100 comprises two main limbs 101, 103 also referred to as antenna heads, extending in rectilinear and substantially parallel manner at a distance apart from each other. This distance is preferably greater than one of the dimensions of the display 3 so that when the antenna is mounted on the housing, the antenna heads 101 and 103 are disposed on either side of said display 3, as shown in FIG. 1.

At one end, each antenna head 101, 103 is connected to the other via an electrical bridge 106. The electrical bridge 106 has a substantially rectilinear central portion 107 extending substantially perpendicularly to the antenna heads 101 and 103. The electrical bridge 106 further includes, on either side of the central portion 107, two S-shaped portions 105 disposed symmetrically as mirror images of each other. The portions 105 serve to join each end of the central portion 107 with the above-mentioned end of the corresponding antenna head 101 or 103. The presence of the S-shaped portions 105 makes it possible to avoid having any metal portions 4 flush with the face 21 of the front wall 2. If a portion of the antenna-forming elements 100 were to face such a metal portion, then the electrical characteristics of the antenna would be altered, thereby disturbing its operation.

In preferred manner, each of the elements 101, 103, and 106 forming the antenna 100 is connected to the electronic circuit within the housing 5 via a respective connection 111, 112, and 113. Each of the connections 111, 112, and 113 presents a first end in direct contact with the corresponding, element 101, 103, or 106, and a second end including connection means 114 suitable for being connected to the electronic circuit. These means are in the form of respective tabs 114, each having a central orifice. In preferred manner, each tab 114 can be soldered to the electronic circuit.

Together, the connections 111, 112, and 113 form a flat cable 115. The connections 111, 112, and 113 are preferably positioned on insulation (not shown). When assembling the electronic label, the flat cable 115 is introduced into the orifice 6 of the housing 5 of the electronic label 1. Thereafter, the connections of the flat cable 115 are soldered to the electronic circuit via the tabs 114. While soldering is being performed, solder passes through the orifices in the tabs 114 and thus acts as a rivet, pressing together the sandwich comprising the insulation of the flat cable, the tab 114, and the electronic circuit. This provides good contact between the antenna connections and the electronic circuit.

The operation of the antenna 100 is described below for a context in which it is to operate at high frequency, preferably at a frequency of about 433 MHz. It should be observed that other high frequencies could be used: e.g. frequencies of about 868 MHz or about 2.4 gigahertz (GHz).

The structure of the antenna 100 as described above presents numerous advantages when operating at very high frequency. At such frequencies, the various elements constituted by the antenna heads 101 and 103, and by the bridge 106 act as coils (or chokes) having intermediate taps 111, 112 serving to match impedance and optimize energy transfer. The antenna 100 forms a current loop that transmits electromagnetic radiation. The display 3 has metal elements in its structure and the fact of having the antenna heads 101 and 103 on either side of said display means that the display acts as a capacitor at high frequency. Thus, an oscillating circuit is obtained in the high frequency range that is made up of chokes and a capacitor. In addition, the antenna can easily be tuned to its transmit frequency by changing its shape.

In a variant embodiment of the antenna of the invention, as shown in FIG. 4, the elements it has in common with the preceding embodiment are given the same references plus 100.

Thus, the antenna 200 is for placing on electronic label housings that are more compact, i.e. that present dimensions that are smaller than those of the housing 5 described above.

As before, the antenna 200 has two antenna heads 201, 203. Each of the antenna heads presents two portions 201 & 202 and 203 & 204, respectively, disposed perpendicularly to each other to form an L-shape. This disposition provides a total length for the antenna heads that is as long as possible, in spite of the small dimensions of the housing on which the antenna 200 is to be installed. The two antenna heads are symmetrical mirror images of each other.

The portions 201 & 202 and 203 & 204 are of greater width than the remaining elements making up the antenna 200. This width is 2 to 2½ times greater than the width forming the ends 221 and 223 respectively of the antenna heads 201 and 203. This serves to increase the capacitive effect of the assembly comprising the antenna heads and the display at high frequencies so as to enable the antenna to be tuned.

The ends 221 and 223 are connected to each other via an electrical bridge 206. This bridge differs from the electrical bridge 206 of the preceding embodiment by the fact that it comprises a single substantially rectilinear portion going from the end 221 to the end 223.

As before, a flat cable 215 serves to connect the various elements 201, 203, and 206 of the antenna 200 to an electronic circuit of the electronic label. The flat cable 215 has three connections 211, 212, and 213 each connected at one end to an antenna head 201, 202 (in this example ends 221, 223) or to the electrical bridge 206 respectively, with the other ends of these connections having respective tabs 114 identical to those of the preceding embodiment.

The antenna 200 is disposed on an electronic label in a manner similar to the antenna 100, the antenna heads 201, 203 surrounding a digital display 3, but presenting smaller dimensions. The flat cable 215 is inserted into an orifice 6 so as to be connected to the electronic circuit.

In preferred manner, the entire antenna 100 or 200 is made of copper. Any other material presenting electrical conductivity could be used for making such antennas, using standard methods that are known in themselves for making printed circuits, in particular flexible printed circuits.

The use of such transmit antennas on electronic labels makes it possible, in non-exhaustive manner:

- to send an acknowledgment of receipt to the central station of the display system when said central station has sent information to the electronic label;
- to send information concerning the state of the electronic label, such as re-reading data that has already been sent or the contents of registers present within the electronic label;
- to be informed about the state of the battery powering the electronic circuit of the electronic label; or indeed
- to be given other information such as the temperature of the label (if the label has a sensor for this purpose), or the light level at the electronic label (likewise if it has a sensor for this purpose).

Naturally, numerous modifications can be made to the invention without going beyond the ambit thereof.

The invention claimed is:

1. An electronic label comprising a housing having at least one wall, an electronic display disposed along the wall, and an antenna layer configured to cooperate with the electronic display to transmit information, the antenna layer extending along the wall in such a manner as to constitute a stack with the wall, the antenna layer comprising at least a first antenna head and at least a second antenna head spaced from the first antenna head such that an area, through which the electronic display is viewable, is at least partially defined in the antenna layer between the first and second antenna heads, wherein the first antenna head and the second antenna head are connected to each other via an electrical bridge in the antenna layer, the electrical bridge extending between the first and second antenna heads, and wherein the first antenna head, the second antenna head, and the electrical bridge are connected to an electronic circuit within the housing via a flat cable, wherein the display comprises metal disposed between the first antenna head and the second antenna head such that the first antenna head, the second antenna head, and the display are capable of acting as a capacitor, and wherein the wall includes the display and the antenna extends on the face of the wall around the display.

2. The electronic label of claim 1, wherein the antenna layer comprises a conductive patterned material disposed on a supporting sheet.

3. The electronic label of claim 1, further comprising an insulating layer, wherein the antenna layer is disposed between the wall and the insulating layer.

4. The electronic label of claim 3, wherein the insulating layer comprises a decorative layer.

5. The electronic label of claim 1, wherein the antenna layer comprises a wire antenna.

6. The electronic label of claim 1, wherein at least a portion of the first antenna head is linear, and wherein at least a portion of the second antenna head is linear and parallel to the linear portion of the first antenna head.

7. The electronic label of claim 1, wherein the flat cable comprises at least one tab soldered to the electronic circuit.

8. The electronic label of claim 7, wherein the tab defines an opening in which solder is disposed.

9. The electronic label of claim 1, wherein the wall defines an opening through which the flat cable is passed.

10. The electronic label of claim 1, further comprising a first impedance-matching tap connected to the first antenna head, and a second impedance-matching tap connected to the second antenna head.

11. The electronic label of claim 1, wherein each antenna head comprises a widened portion.

12. The electronic label of claim 1, wherein the first antenna head comprises two widened portions that are disposed perpendicular to each other such that a first L-shape is defined, and wherein the second antenna head comprises two widened portions that are disposed perpendicular to each other such that a second L-shape is defined.

13. The electronic label of claim 12, wherein the first L-shape is defined as a mirror image of the second L-shape, and wherein the first antenna head is disposed relative to the second antenna head such that the first L-shape and second L-shape are symmetrical.

* * * * *